(12) United States Patent
Oh et al.

(10) Patent No.: US 7,063,520 B2
(45) Date of Patent: Jun. 20, 2006

(54) SUCTION VALVE ASSEMBLY OF RECIPROCATING COMPRESSOR

(75) Inventors: Won-Sik Oh, Seoul (KR); Sang-Man Oh, Seoul (KR); Hyung-Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 124 days.

(21) Appl. No.: 10/331,761

(22) Filed: Dec. 31, 2002

(65) Prior Publication Data

US 2003/0206817 A1  Nov. 6, 2003

(30) Foreign Application Priority Data

| May 6, 2002 | (KR) | ................ 10-2002-0024855 |
| May 6, 2002 | (KR) | ................ 10-2002-0024856 |
| Aug. 1, 2002 | (KR) | ................ 10-2002-0045660 |

(51) Int. Cl.
*F04B 53/10* (2006.01)

(52) U.S. Cl. .............. 417/547; 417/545; 417/552; 417/555.1; 137/857; 137/514; 137/855

(58) Field of Classification Search ........ 417/545, 417/552, 547, 555.1; 137/857, 514, 855
See application file for complete search history.

(56) References Cited

U.S. PATENT DOCUMENTS

| 892,594 | A | * | 7/1908 | Killian .................. 417/552 |
| 955,822 | A | * | 4/1910 | Mayhew ................ 417/447 |
| 1,416,696 | A | * | 5/1922 | Dennedy ............... 417/550 |
| 1,599,414 | A | * | 9/1926 | Huff ...................... 137/512.1 |
| 1,614,124 | A | * | 1/1927 | Hansen ................. 137/512.15 |
| 1,619,481 | A | * | 3/1927 | Oakes ................... 417/531 |
| 1,682,736 | A | * | 9/1928 | Berry .................... 417/447 |
| 1,768,638 | A | * | 7/1930 | Sheats ................... 137/512.4 |
| 1,915,694 | A | * | 6/1933 | Reindel ................. 417/458 |
| 3,037,523 | A | * | 6/1962 | Szaniszlo .............. 137/514 |
| 3,844,389 | A | * | 10/1974 | de Carbon ............ 188/322.15 |
| 4,846,221 | A | * | 7/1989 | Kanemaru ............ 137/614.17 |

(Continued)

FOREIGN PATENT DOCUMENTS

CN  1221857  7/1999

(Continued)

OTHER PUBLICATIONS

English language Abstract of DE 4412714.

(Continued)

*Primary Examiner*—Charles G. Freay
*Assistant Examiner*—Emmanuel Sayoc
(74) *Attorney, Agent, or Firm*—Greenblum & Bernstein, P.L.C.

(57) ABSTRACT

In a reciprocating compressor including a piston slide-inserted into the compression space of the cylinder, having a gas path therein, inducing a fluid into the compression space through the gas path and varying a volume of the compression space while performing a linear reciprocating motion with a mover of a reciprocating motor; a suction valve combined with the front end of the piston detachably and adjusting suctioning of the fluid into the compression space; and a discharge valve combined with the front end of the piston detachably and opening/closing the compression space of the cylinder in the linear reciprocating motion of the piston, a suction valve assembly of a reciprocating compressor includes an elastic member for absorb impact of the suction valve in clash and a combining member consisting of a head portion having a width so as to be overlapped with part of an opening/closing portion of the suction valve or a retainer and a valve seat, and accordingly a reliability of the compressor can be improved.

14 Claims, 10 Drawing Sheets

U.S. PATENT DOCUMENTS

| | | | | |
|---|---|---|---|---|
| 5,080,565 | A | * | 1/1992 | Schultz et al. ............... 417/550 |
| 5,171,135 | A | | 12/1992 | Gannaway et al. |
| 5,425,398 | A | * | 6/1995 | Moradmand et al. ........ 137/854 |
| 5,562,430 | A | * | 10/1996 | Schuller et al. ............. 417/545 |
| 5,647,395 | A | * | 7/1997 | Hashimoto et al. .......... 137/517 |
| 5,993,178 | A | * | 11/1999 | Park et al. ................... 417/545 |
| 6,006,786 | A | * | 12/1999 | Ito .............................. 137/857 |
| 6,202,791 | B1 | * | 3/2001 | Oh et al. .................... 184/6.16 |
| 6,319,410 | B1 | * | 11/2001 | Allington et al. ............ 210/634 |
| 6,454,545 | B1 | * | 9/2002 | Ikeda et al. ................. 417/269 |
| 6,514,058 | B1 | * | 2/2003 | Chou ......................... 417/553 |
| 2003/0165391 | A1 | | 9/2003 | Kim |

FOREIGN PATENT DOCUMENTS

| | | |
|---|---|---|
| DE | 4413714 | 4/1995 |
| JP | 8-338368 | 12/1996 |
| JP | 14-54570 | 2/2002 |
| KR | 176827 | 10/1999 |

OTHER PUBLICATIONS

English language Abstract of Korean 176827.
English language Abstract of JP 8-338368.
English language Abstract of JP 14-54570.
English language translation of German Office Action of German Patent application No. 10302303.8.

* cited by examiner

SUCTION VALVE ASSEMBLY OF RECIPROCATING COMPRESSOR

BACKGROUND OF THE INVENTION

1. Field of the Invention

The present invention relates to a reciprocating compressor, and in particular to a suction valve assembly of a reciprocating compressor which is capable of reducing valve crashing sound occurred in opening/closing of a suction valve, preventing breakage of the suction valve due to clash against the front end of a piston and improving an opening/closing speed of the suction valve installed on the front end of the piston and restricting suction of a coolant gas.

2. Description of the Prior Art

In general, a reciprocating compressor is for compressing a fluid such as air or coolant gas, etc. A compressor includes a motor part installed inside a sealed casing and generating a driving force; and a compression part for sucking and compressing a coolant gas by receiving the driving force of the motor part.

According to a gas compression mechanism of the motor part and the compression part, the compressor is divided into a rotary compressor, a reciprocating compressor and a scroll compressor, etc.

Figure 1:
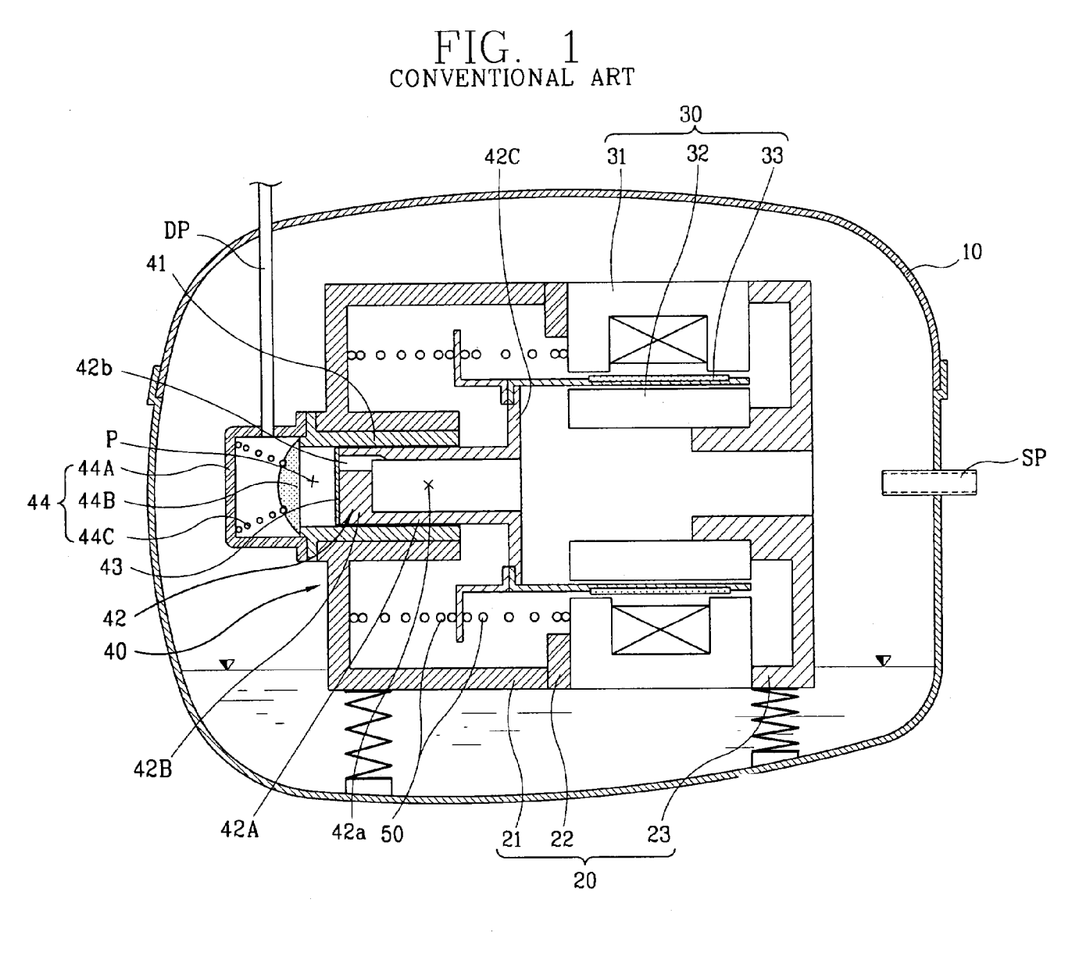
FIG. 1 is a longitudinal-sectional view illustrating the conventional reciprocating compressor.

In more detail, in the reciprocating compressor, a driving force of a motor part is transmitted to a piston, the piston performs a linear reciprocating motion inside a cylinder, and a coolant gas is sucked, is compressed and is discharged according to the motion. FIG. 1 is a longitudinal sectional view illustrating an embodiment of the conventional reciprocating compressor.

As depicted in FIG. 1, the conventional reciprocating compressor includes a casing 10 in which a gas suction pipe SP and a gas discharge pipe DP are combined; a frame unit 20 elastically supported inside the casing; a reciprocating motor 30 fixed inside the casing 10 by being supported by the frame unit 20; a compression unit 40 mechanically connected to the reciprocating motor 30 and supported by the frame unit 20; and a resonance spring unit 50 for inducing resonance by elastically supporting a mover 33 of the reciprocating motor 30 and a piston 42 of the compression unit 40.

The frame unit 20 includes a front frame having a rough shape, a middle frame 22 and a rear frame 23.

The compression unit 40 includes the cylinder 41 fixed to the front frame 21 of the frame unit 20; the piston 42 combined with the mover 33 of the reciprocating motor 30 and performing a reciprocating motion in a compression space (P) formed inside the piston 41; a suction valve 43 installed on the front end of the piston 42 and restricting suction of a coolant gas by opening/closing a suction through hole 42b of the piston 42; and a discharge valve assembly 44 installed on a discharge side of the cylinder 41 and restricting discharge of a compression gas by opening/closing the compression space (P).

Figure 2:
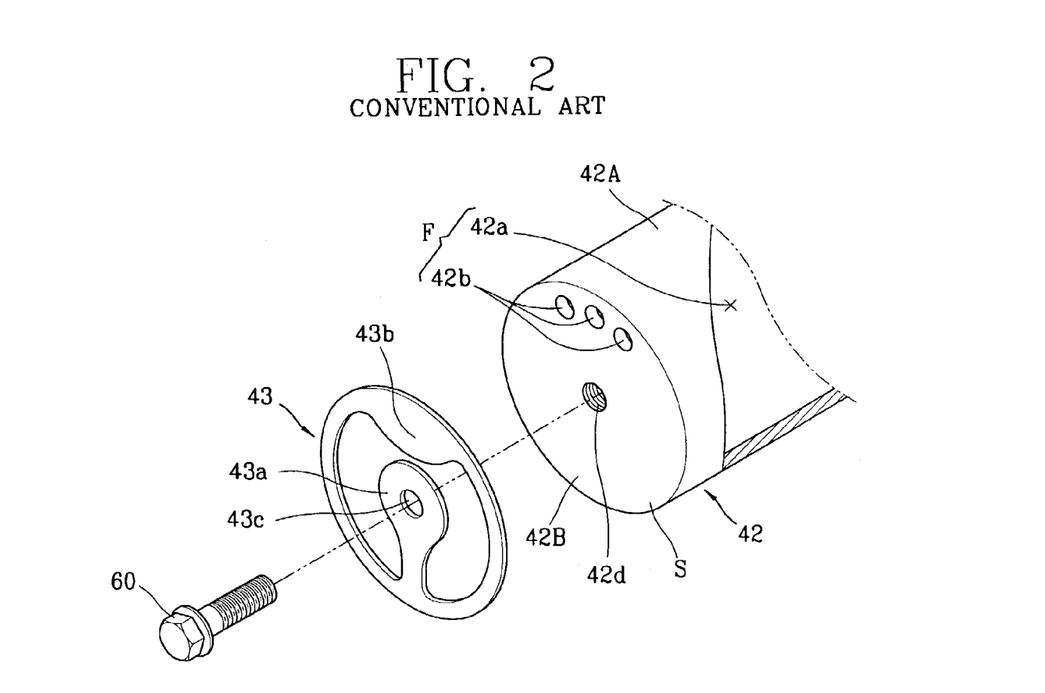
FIG. 2 is an exploded view illustrating a piston and a suction valve of the conventional reciprocating compressor.

As depicted in FIG. 2, in the piston 42, a rod-shaped head portion 42B having a certain length is formed at a side of a body portion 42A, and a connection portion 42C connected to the reciprocating motor 30 is formed at the other side of the body portion 42A.

And, a gas flow path (F) is pierced in the piston 42 so as to flow the coolant gas. The gas flow path (F) includes a suction path 42a formed at the center of the body portion 42A so as to have a certain depth and a suction through hole 42b pierced in the head portion 42B so as to communicate with the suction path 42a.

And, the suction through hole 42b can be variously shaped according to a shape of the suction valve 43, in consideration of the suction valve 43 shown in FIG. 2 which is a reed valve having two arms, plural suction through holes are formed at the edge of the piston 42.

And, the front end of the piston head portion 42B is a valve contact surface (S) as a plane, and a combining groove 42d is formed at the center of the valve contact surface (S) to be combined with the suction valve for opening/closing the suction through hole 42b by a bolt 60.

In the meantime, the suction valve 43 is made of a material having strong elasticity, the center thereof is formed as a thin circular plate so to be corresponded to the valve contact surface (S) of the piston 42, a fixation portion 43a is formed by cutting the center of the circular plate, and the opening/closing portion 43b having two arms is formed at the end of the circular plate.

In addition, a combining hole 43c is pierced in the fixation portion 43a so as to correspond to the combining groove 42d of the piston 42, and the opening/closing portion 43b is formed so as to open/close the suction through hole 42b of the piston 42.

And, in the combining bolt 60, a male screw is formed at the body portion 61 having a certain length, a bolt head portion 62 having a certain thickness and a hexagonal shape is formed at a certain side of the body portion 62, herein, a diameter of the head portion 62 is smaller than an imaginary circle connecting the inner ends of the suction through hole 42b.

In drawings, reference numeral 31 is an outer stator, 32 is an inner stator, 42d is a combining groove, 43c is a combining hole, 44A is a discharge cover, 44B is a discharge valve, and 44C is a valve spring.

Hereinafter, the operation of the conventional reciprocating compressor will be described.

First, when power is applied to the reciprocating motor 30, flux is formed between the outer stator 31 and the inner stator 32, the mover 33 performs a linear reciprocating motion by being moved according to the direction of the flux, according to it, the piston 42 performs the linear reciprocating motion inside the cylinder 41, a pressure difference occurs in the compression space (P) of the cylinder 41, the coolant gas is sucked into the compression space (P) through the gas suction pipe (SP), is compressed up to a certain pressure, is discharged through the gas discharge pipe (DP), and the process is performed repeatedly.

Figure 3:
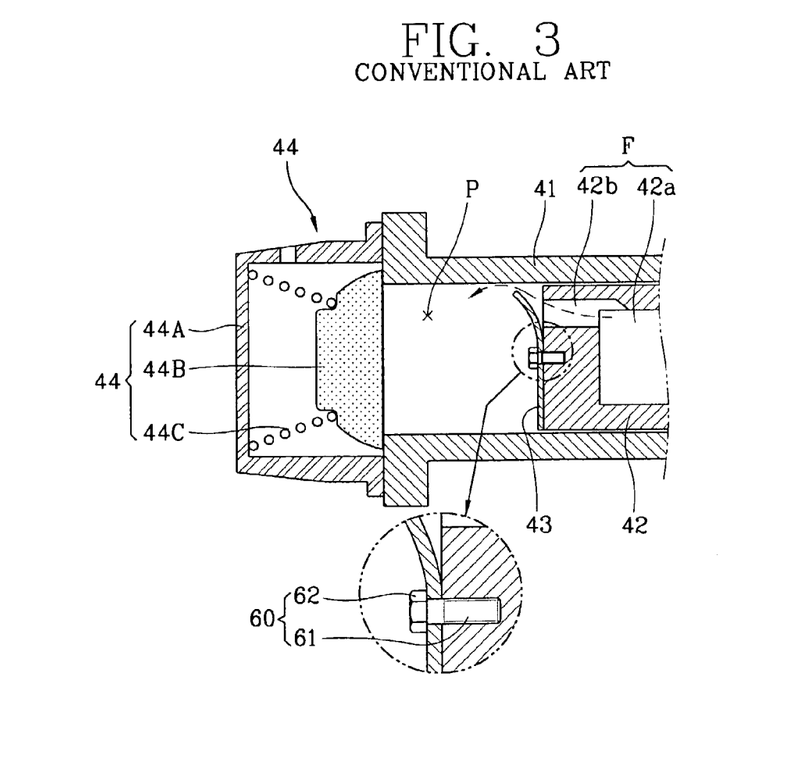
FIG. 3 is a sectional view illustrating an operation state of a compression part of the conventional reciprocating compressor.

In that process, as depicted in FIG. 3, when the piston 42 is moved toward the bottom dead point, the discharge valve 44B is contacted to the end of the cylinder 41 and closes the compression space (P), simultaneously part of the suction valve 43 combined with the piston 42 is curved by the pressure difference and opens the gas flow path (F) in the piston 42. Herein, the coolant gas is sucked into the compression space (P) of the cylinder 41 through the gas flow path (F) of the piston 42.

Afterward, when the piston 42 is moved from the bottom dead point to the upper dead point, by the compression difference between the compression space (P) and the suction space and the elastic force of the suction valve 43, the curved suction valve 43 is straightened and closes the gas flow path (F) of the piston 42, simultaneously the coolant gas sucked into the compression space (P) of the cylinder 41 is compressed. And, when the piston 42 reaches the upper dead point almost, the discharge valve 44B is open, and the compressed coolant gas is discharged. The coolant gas is continually compressed by performing the above-described process repeatedly.

However, in the conventional reciprocating, the opening/closing portion 43b of the suction valve 43 closes/opens the suction valve 42b by being contacted/separated to/from the front end of the piston 42, in that operation, valve clash sound may occur when the suction valve 43 clashes against the front end of the piston 42.

In addition, in fabricating of the suction through hole 42b of the piston 42, burr occurs at the edge portion of the suction through hole 42b, however, it is difficult to remove the burr, the suction valve may clash against the burr in the opening/closing operation and may be damaged by that.

In addition, by the compression difference of the compression space (P) of the cylinder 41 occurred by the reciprocating motion of the piston 42, the suction valve 43 opens/closes the gas flow path (F) by being curved/straightened repeatedly, in that operation, the suction valve 43 may not be moved well, the compression gas may flow reversely or a gas suction quantity may be lowered. In more detail, the coolant gas suction quantity is adjusted by using strength of the suction valve 43, when strength of the suction valve 43 is comparatively weak, the suction valve 43 may be excessively opened, the closing operation may be delayed, and accordingly gas compressed in the compression space (P) may be reversely flowed. On the contrary, when strength of the suction valve 43 is comparatively strong, the opening operation of the suction valve 43 may be delayed, and accordingly a coolant gas suction quantity may be lowered.

SUMMARY OF THE INVENTION

In order to solve the above-mentioned problem, it is an object of the present invention to provide a suction valve assembly of a reciprocating compressor which is capable of reducing valve clash noise occurred in opening/closing of a suction valve, preventing the suction valve from being damaged due to clash against the front end of a piston and improving an opening/closing speed of the suction valve installed on the front end of the piston and restricting suction of a coolant gas.

In order to achieve the above-mentioned object, in a reciprocating compressor including a cylinder forming a compression space; a piston slide-inserted into the compression space of the cylinder, having a gas path therein, inducing a fluid into the compression space through the gas path and varying a volume of the compression space while performing a linear reciprocating motion with a mover of a reciprocating motor; a suction valve combined with the front end of the piston detachably and adjusting suctioning of the fluid into the compression space; and a discharge valve combined with the front end of the piston detachably and opening/closing the compression space of the cylinder in the linear reciprocating motion of the piston, a suction valve assembly of a reciprocating compressor in accordance with the present invention includes an elastic member installed on the front end of a piston facing a suction valve in order to absorb impact of the suction valve in clash.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, embodiments of the present invention will be described with reference to accompanying drawings.

First, a first embodiment of a suction valve assembly of a reciprocating compressor in accordance with the present invention will be described.

Figure 4:
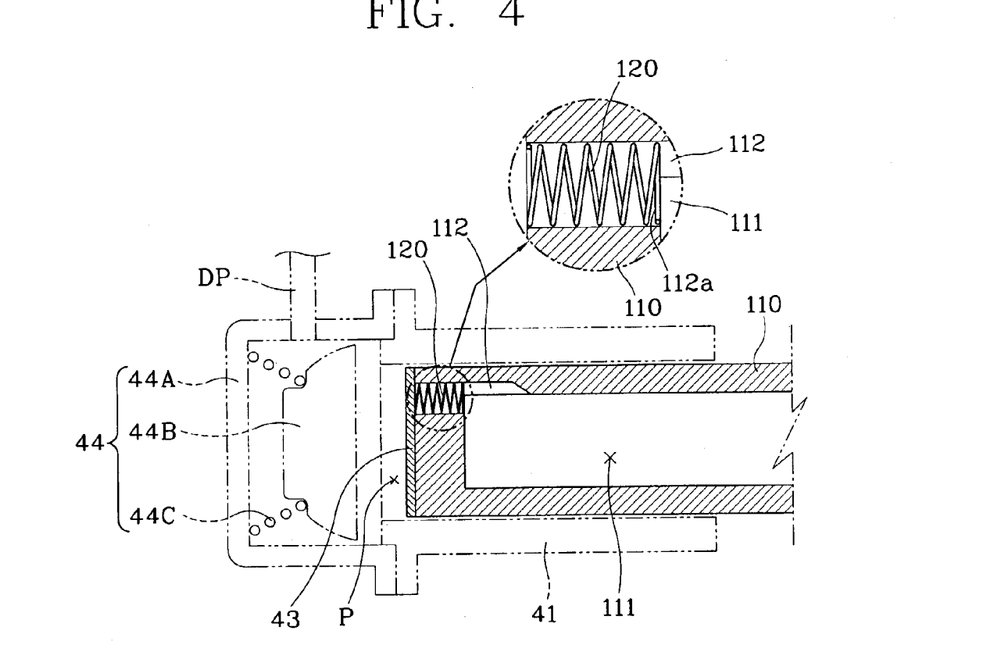
FIG. 4 is a longitudinal-sectional view illustrating a compression unit of a suction valve assembly of a reciprocating compressor in accordance with a first embodiment of the present invention.
Figure 5:
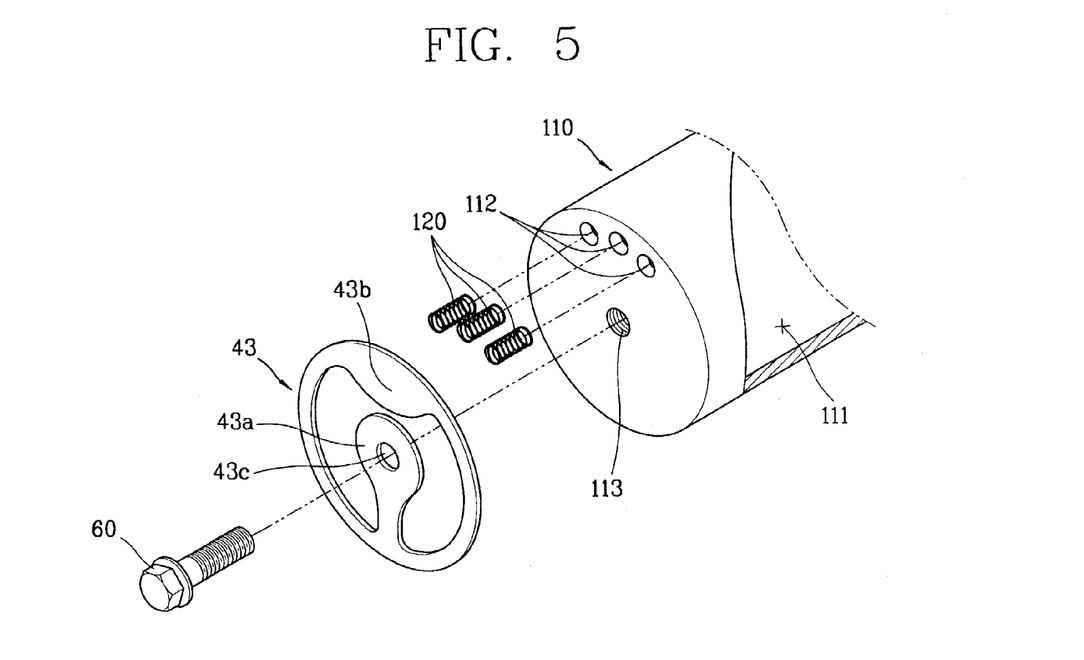
FIG. 5 is an exploded view illustrating a piston and a suction valve of the suction valve assembly of the reciprocating compressor in accordance with the first embodiment of the present invention.
Figure 6:
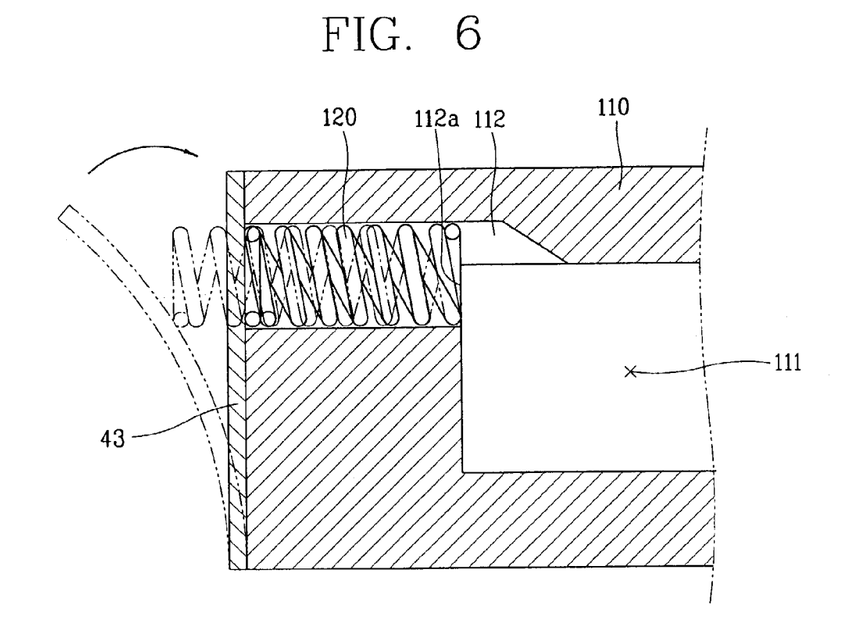
FIG. 6 illustrates a closing process of the suction valve in accordance with the first embodiment of the present invention.

FIG. 4 is a longitudinal-sectional view illustrating a compression unit of a suction valve assembly of a reciprocating compressor in accordance with a first embodiment of the present invention, FIG. 5 is an exploded view illustrating a piston and a suction valve of the suction valve assembly of the reciprocating compressor in accordance with the first embodiment of the present invention, and FIG. 6 illustrates a closing process of the suction valve in accordance with the first embodiment of the present invention.

As depicted in FIGS. 4~6, the suction valve assembly of the reciprocating compressor in accordance with the present invention includes a cylinder 41 inserted into a frame unit 20 (shown in FIG. 1) and having a compression space (P) therein; a piston 110 slide-inserted into the compression space (P) of the cylinder 41, having a gas path therein and varying a volume of the compression space (P) while performing a linear reciprocating motion with a mover 33 of a reciprocating motor 30 (shown in FIG. 1); a suction valve 43 combined with the front end of the piston 110 detachably and opening/closing the suction through hole 112; and an elastic member 120 inserted into the suction through hole 112 of the piston 110 and absorbing impact in closing of the suction valve 43.

In the piston 110, a suction path 111 is formed in the axial direction, and plural suction through holes 112 are formed at the internal end so as to communicate with the suction path 111 and pierce the front end of the suction valve 43.

The suction through hole 112 can be formed variously according to a shape of the suction valve 43, in consideration of the shape of an opening/closing portion 43b of the suction valve 43 which is a reed valve having two arms, plural suction through holes 112 are intensively formed at the edge of a certain side of the piston 110 as shown in FIG. 5.

In addition, in order to lengthen the arm length of the suction valve 43 in forming, the suction through hole 112 abuts on the edge of the front end, a stepped portion 112a is formed at the inner portion at which the suction through hole 112 and the suction path 111 meet each other, and the elastic member 120 is mounted onto the stepped portion 112a.

The suction valve 43 is made of a material having strong elasticity, a fixation portion 43a fixed to the front end of the piston 110 is formed at the center of the suction valve 43, and the opening/closing portion 43b having two arms is formed at the edge of the fixation portion 43a so as to open/close the suction through hole 112 of the piston 110.

The elastic member 130 is a compression coil spring, the elastic force of the elastic member 130 is smaller than a gas force of the compression gas acting on the back of a sealing surface of the suction valve 43 in closing of the suction valve 43 in order to prevent leakage of the compression gas due to loose-fitting of the opening/closing portion 43b of the suction valve 43.

In addition, in order to fix the elastic member 120 by forcibly inserting it into the suction through hole 112 of the piston 110, an inner diameter of the suction through hole 112 is almost same with an outer diameter of the elastic member 120.

Parts same with those of the conventional art will have the same reference numerals.

Reference numeral 44A is a discharge cover, 44B is a discharge valve, 44C is a valve spring, 113 is a combining groove, 123 is a combining hole, and 60 is a combining bolt.

The operation and advantages of the suction valve assembly of the reciprocating compressor in accordance with the first embodiment of the present invention will be described.

A mover 33 of the reciprocating motor 30 performs the linear reciprocating motion with the piston 110, a pressure difference occurs in the compression space (P) of the cylinder 41 by the linear reciprocating motion of the piston 110 inside the cylinder 41, coolant gas is sucked into the compression space (P), is compressed and discharged. The process is repeatedly performed.

Herein, when the piston 110 performs the suction process by moving backward, the opening/closing portion 43b of the suction valve 43 is open centering around the fixation portion 43a by being pushed by the coolant gas to be sucked into the compression space (P) through the suction path 111 and the suction through hole 112 of the piston 110, when the piston 110 performs the compression process by moving forward, the open opening/closing portion 43b closes the suction through hole 112, and the compression space (P) is closed.

Herein, in the closing of the suction valve 43, it may clash against the front end of the piston 110 and generate valve clash sound, however, in the present invention, it clashes first against the elastic member 120 formed on the suction through hole 112 of the piston 110, the impact is absorbed, and accordingly the valve clash noise of the suction valve 43 can be lowered.

Figure 7:
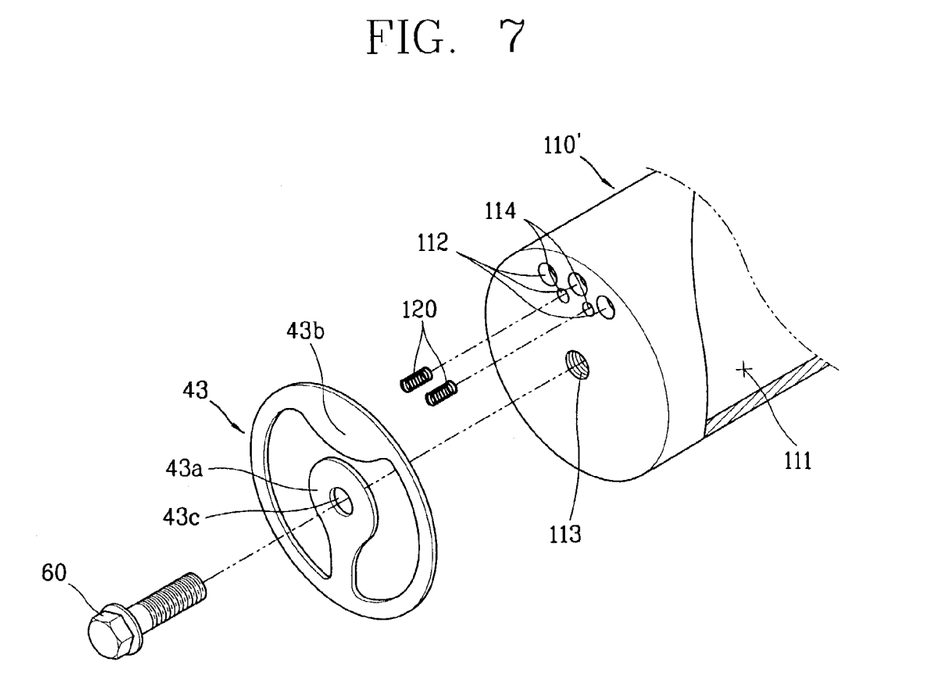
FIG. 7 is an exploded view illustrating another example of the suction valve assembly of the reciprocating compressor in accordance with the first embodiment of the present invention.

In the meantime, as depicted in FIG. 7, a spring installation groove 114 is additionally formed between the suction through holes 112 of the piston 110', and an elastic member 120 is forcibly inserted into the spring installation groove 114.

In that case, a fabrication cost is increased in comparison with inserting the elastic member 120 into the suction through hole 112, however, flow resistance of a coolant gas is reduced, it is possible to improve an efficiency of the compressor.

Figure 8:
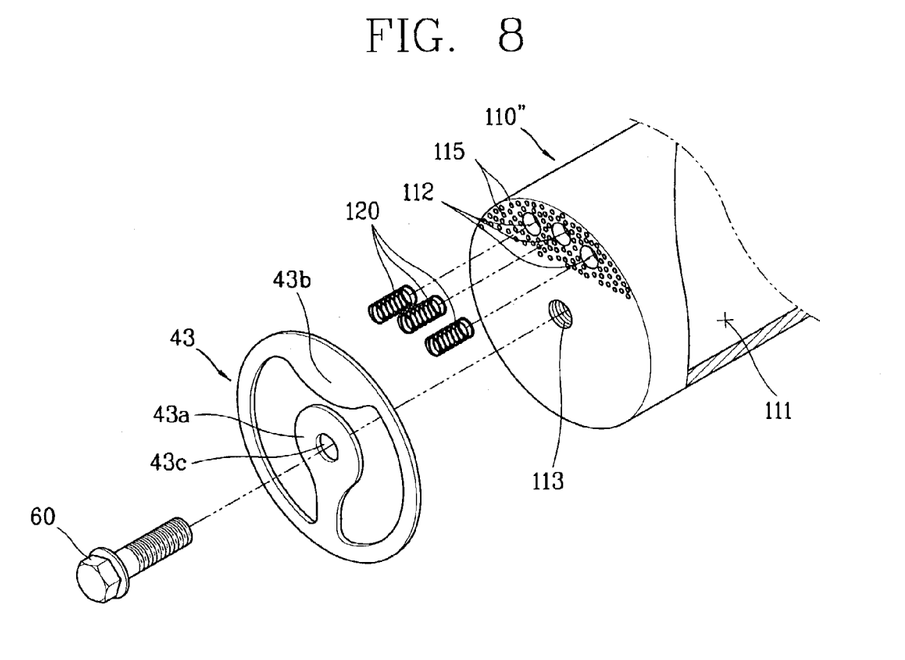
FIG. 8 is an exploded view illustrating yet another example of the suction valve assembly of the reciprocating compressor in accordance with the first embodiment of the present invention.

In addition, as depicted in FIG. 8, plural minute buffer grooves 115 can be formed on the front end of a piston 110" facing the opening/closing portion 43b of the suction valve 43 besides the elastic member 120.

In that case, part of suction gas or compression gas remains in the buffer grooves 115, in the closing of the suction valve 43, clash sound occurred between he suction valve 43 and the piston 110 can be lowered more efficiently.

Next, a suction valve assembly of a reciprocating compressor in accordance with a second embodiment of the present invention will be described.

Figure 9:
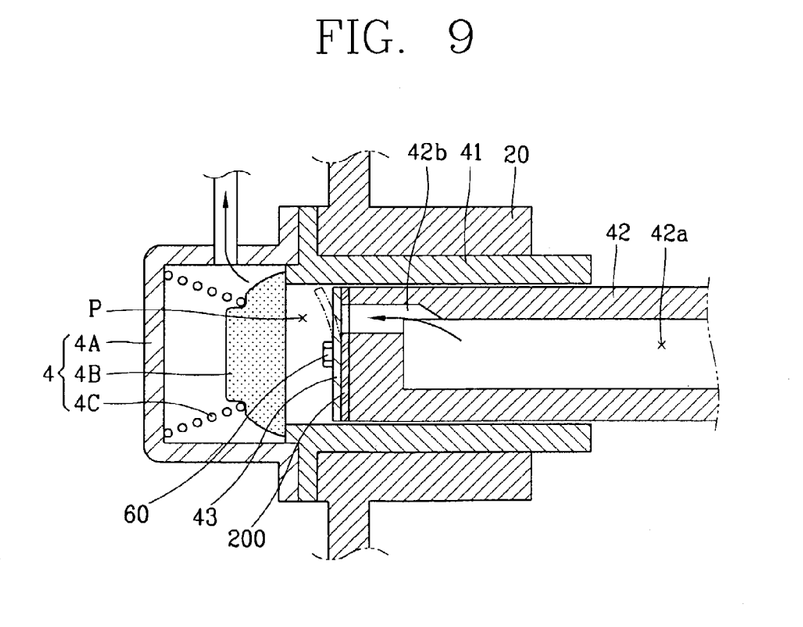
FIG. 9 is a longitudinal-sectional view illustrating an example of a compression unit of a suction valve assembly of a reciprocating compressor in accordance with a second embodiment of the present invention.
Figure 10:
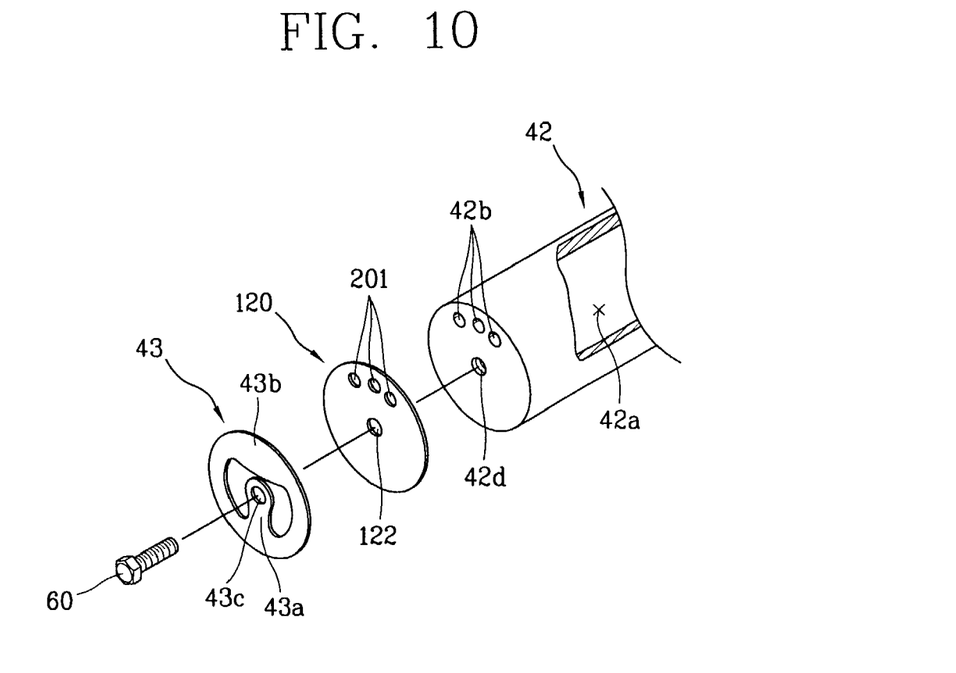
FIG. 10 is am exploded view illustrating the suction valve assembly of the reciprocating compressor in accordance with the second embodiment of the present invention.

FIG. 9 is a longitudinal-sectional view illustrating an example of a compression unit of a suction valve assembly of a reciprocating compressor in accordance with a second embodiment of the present invention, and FIG. 10 is am exploded view illustrating the suction valve assembly of the reciprocating compressor in accordance with the second embodiment of the present invention.

As depicted in FIGS. 9 and 10, in the suction valve assembly of the reciprocating compressor in accordance with the second embodiment of the present invention, a valve seat 220 is installed between the piston 42 and the suction valve in order to prevent breakage of the suction valve 43.

The piston 42 includes the suction path 42a and the plural suction through holes 42b formed from the end of the suction path 42a to the front end of the piston 42.

The suction path 42a is formed in fabricating of the piston 42, and the suction through holes 42b are formed by drilling, etc. after the fabrication of the piston 42.

In addition, the suction path 42a is lengthily formed from the rear end to the front end of the piston 42a. On the contrary, the plural suction through holes 42b are formed at the edge of the front end.

And, the suction through holes 42b can be variously shaped according to a shape of the suction valve 42.

The suction valve 43 is made of a material having strong elasticity, a fixation portion 43a fixed to the front end of the piston 42 is formed at the center of the suction valve 43, and the opening/closing portion 43b having two arms is formed at the edge of the fixation portion 43a so as to open/close the suction through holes 42b of the piston 42.

And, a combining hole 43c is formed at the center of the fixation portion 43a in order to fix the suction valve 43 and the valve seat 200 together in the combining groove 42d formed at the front center of the piston 42 by a combining bolt 60.

And, the valve seat 200 is formed as a thin circular shape same with the front end of the piston 42. In the valve seat 200, a suction hole 201 having the same position and size with the suction through hole 42b of the piston 42 is formed at the side of the edge, and a through hole 202 is formed at the center so as to pass the combining bolt 60 passing the combining hole 43c of the suction valve 43.

In the meantime, it is preferable for the valve seat 200 to be made of the same material with the suction valve 43 in order to prevent the valve seat 200 from being damaged in clash against the suction valve 43.

Parts same with those of the conventional art will have the same reference numerals.

Reference numeral 44 is a discharge valve assembly, 44A is a discharge cover, 44B is a discharge valve, and 44C is a valve spring.

Hereinafter, the operation and advantages of the suction valve assembly of the reciprocating compressor in accordance with the second embodiment of the present invention will be described.

Figure 11:
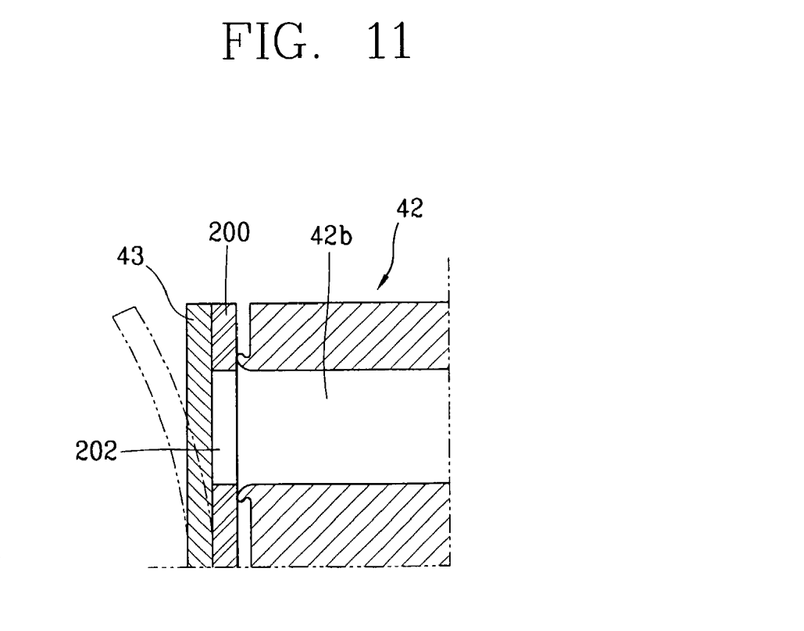
FIG. 11 is a longitudinal-sectional view illustrating the operation process of the suction valve assembly of the reciprocating compressor in accordance with the second embodiment of the present invention.

In the coolant gas suction, compression and discharge process, the suction valve assembly of the reciprocating compressor detaches/separates to/from the front end of the piston 42 by the coolant gas sucked through the suction path 42a and the suction through hole 42b in the backward moving of the piston 42 and the coolant gas compressed in the compression space (P) in the forward moving of the piston 42, when the front end of the piston 42 is not evenly processed, because impact acting on the suction valve 43 is irregular, a portion receiving comparatively greater impact is damaged first, and later a whole suction valve 43 may be damaged. However, as depicted in FIG. 11, by installing the valve seat 200 having the even both sides between the front end of the piston 42 and the suction valve 43, when the suction valve 43 is closed, it contacts to the even surface of the valve seat 200, and accordingly breakage of the suction valve 43 can be prevented from occurring.

Accordingly, by applying the valve seat, it is possible to cope easily with burr occurred in a later process such as a drilling process of the piston 42.

Next, a suction valve assembly of a reciprocating compressor in accordance with a third embodiment of the present invention will be described.

Figure 12:
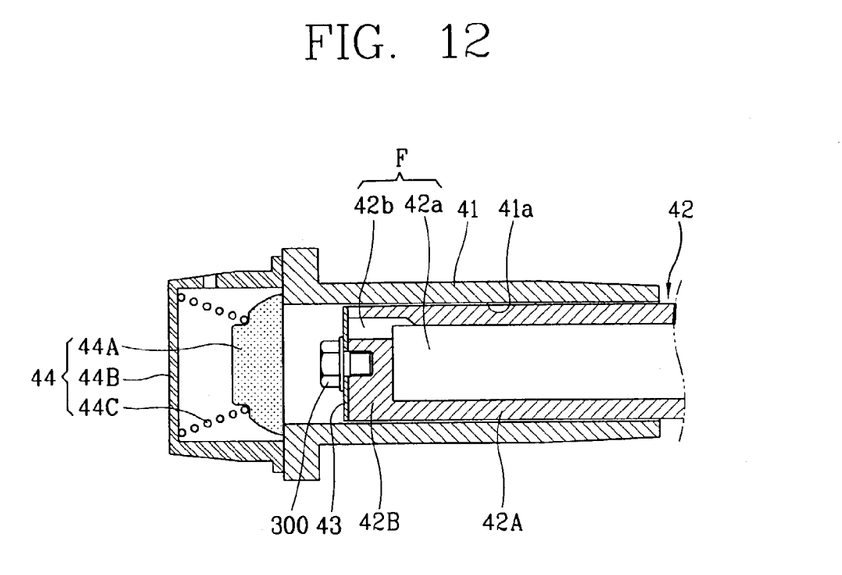
FIG. 12 is a sectional view illustrating a compression part of a suction valve assembly of a reciprocating compressor in accordance with a third embodiment of the present invention.
Figure 13:
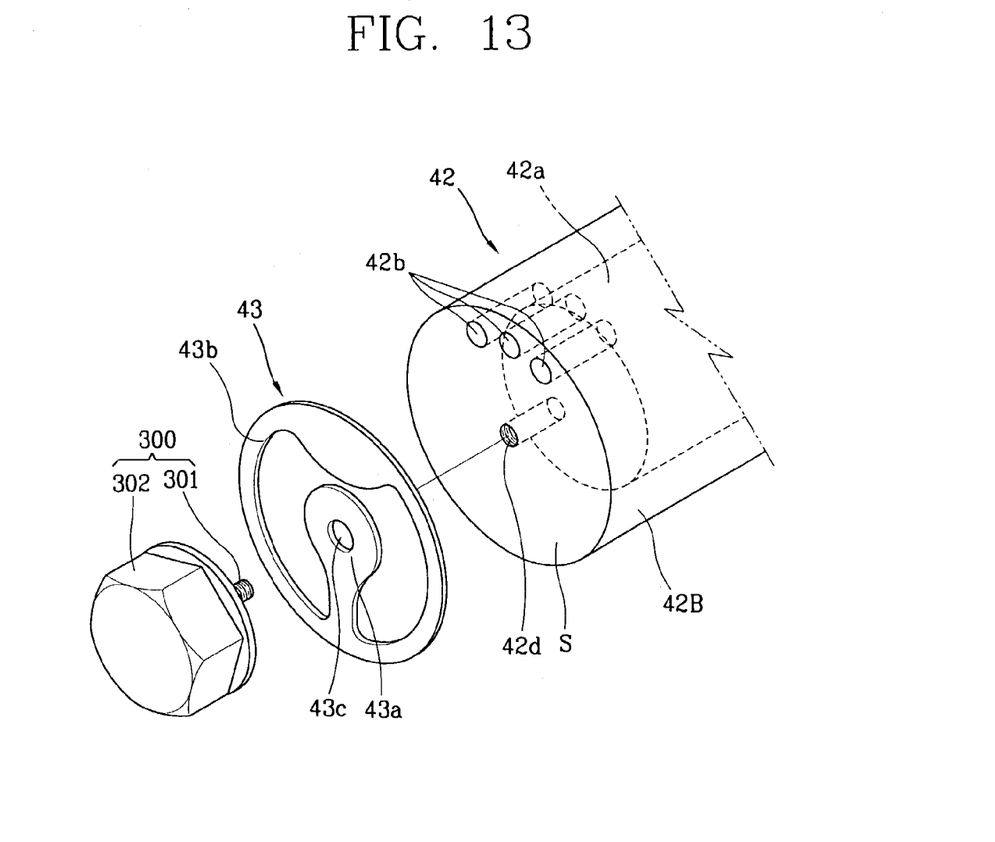
FIG. 13 is an disassembled view illustrating a piston and a suction valve of the compression part of the suction valve assembly of the reciprocating compressor in accordance with the third embodiment of the present invention.
Figure 14:
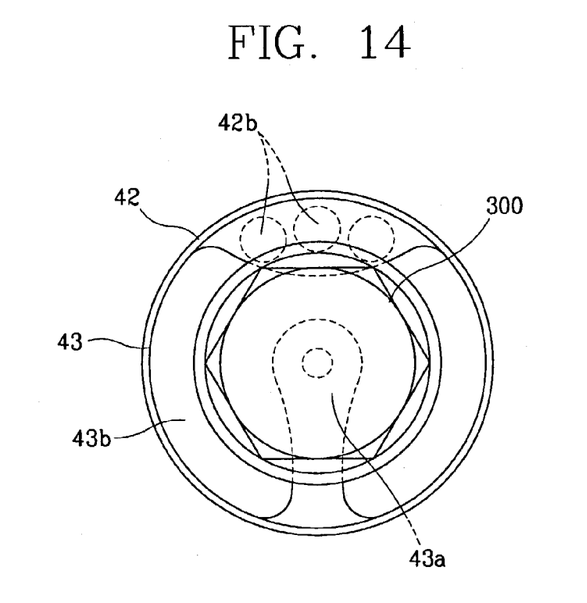
FIG. 14 is a front view illustrating combining of a suction path, a suction valve and a stopper of the suction valve assembly of the reciprocating compressor in accordance with the third embodiment of the present invention.
Figure 15:
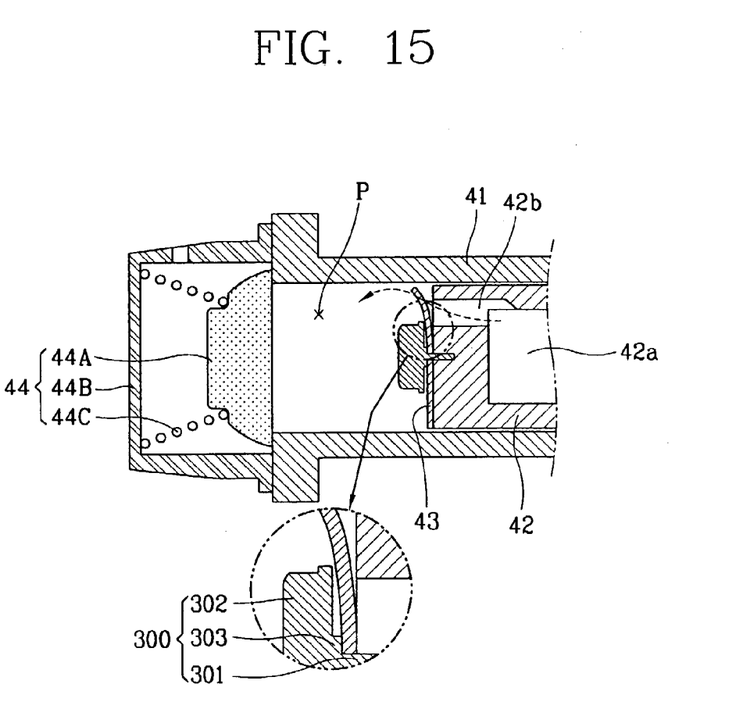
FIG. 15 is an sectional view illustrating the operation state of the compression part of the suction valve assembly of the reciprocating compressor in accordance with the third embodiment of the present invention.

FIG. 12 is a sectional view illustrating a compression part of a suction valve assembly of a reciprocating compressor in accordance with a third embodiment of the present invention, FIG. 13 is an disassembled view illustrating a piston and a suction valve of the compression part of the suction valve assembly of the reciprocating compressor in accordance with the third embodiment of the present invention, FIG. 14 is a front view illustrating combining of a suction path, a suction valve and a stopper of the suction valve assembly of the reciprocating compressor in accordance with the third embodiment of the present invention, and FIG. 15 is an sectional view illustrating the operation state of the compression part of the suction valve assembly of the reciprocating compressor in accordance with the third embodiment of the present invention.

As depicted in FIGS. 12~15, a compression part of the suction valve assembly of the reciprocating compressor in accordance with the third embodiment of the present invention includes a cylinder 41 having a trough hole 41a forming a compression space (P); a piston 42 combined with a motor part and inserted into the through hole 41a of the cylinder 41 so as to perform the linear reciprocating motion; a discharge valve assembly 44 combined with the end of the piston 41 so as to cover the through hole 41a; a suction valve 43 combined with the end of the piston 42 so as to open/close a gas path (F) formed inside the piston 42; and a combining bolt 300 for fixing the suction valve 43 to the piston 42 and restricting an open degree of the suction valve 43.

In the piston 42, a rod-shaped head portion 42B having a certain length is formed at a side of a body portion 42A, and a connection portion 42C connected to the motor part is formed at the other side of the body portion 42A, and the gas flow (F) is pierced in the piston 42 so as to flow the coolant gas. The gas flow path (F) includes a suction path 42a formed at the center of the body portion 42A so as to have a certain depth and a suction through hole 42b pierced in the head portion 42B so as to communicate with the suction path 42a.

And, the front end of the piston head portion 42B is a valve contact surface (S) as a plane, and a combining groove 42d is formed at the valve contact surface (S), and the suction valve 43 is installed onto the valve contact surface (S) so as to open/close the suction through hole 42b.

As depicted in FIG. 13, in the suction valve 43, the center thereof is formed as a thin circular plate so to be corresponded to the valve contact surface (S) of the piston 42, a fixation portion 43a is formed by cutting the center of the circular plate, and the opening/closing portion 43b having two arms is formed at the edge of the circular plate connected to the fixation portion 43a.

A combining hole 43c is pierced in the fixation portion 43a so as to correspond to the combining groove 42d of the piston 42, and the opening/closing portion 43b is formed so as to open/close the suction through hole 42b of the piston 42.

In the combining bolt 60, a male screw is formed at the body portion 61 having a certain length, a bolt head portion 62 having a certain thickness and a hexagonal shape is formed at a certain side of the body portion 62.

As depicted in FIG. 14, a diameter of the head portion 62 is greater than an imaginary circle connecting the inner ends of the suction through hole 42b so as to overlap with the suction through hole 42b.

In addition, as depicted in FIG. 15, in the combining bolt 300, a stepped portion 303 is formed between the end of the body portion 301 and the head portion 302 so as to compress the front end of the head portion 42B of the piston 42 by pressing the fixation portion 43a of the suction valve 43 or an interval maintaining member, etc. such as a washer (not shown) can be inserted.

The stepped portion or the interval maintaining member has a certain length in order to make the opening/closing portion 43b have an interval contactable to the head portion 302 of the combining bolt 300 when the opening/closing portion 43b of the suction valve 43 is open, a section area thereof is greater than a diameter of the through hole 43c and is smaller than the imaginary circle connecting the inner ends of the suction through hole 42b.so sa to press only the circumference of the through hole 43c of the suction valve 43.

Parts same with those of the conventional art will have the same reference numerals.

Reference numeral 44 is a discharge valve assembly, 44A is a discharge cover, 44B is a discharge valve, and 44C is a valve spring.

The operation and advantages of the suction valve assembly of the reciprocating compressor in accordance with the third embodiment of the present invention will be described.

The piston 42 of the compression part performs the linear reciprocating motion inside the cylinder 41 by receiving the driving force of the motor part.

In that process, as depicted in FIG. 15, when the piston 42 is moved toward the bottom dead point, the discharge valve 44B is contacted to the end of the cylinder 41 and closes the compression space (P), simultaneously part of the suction valve 43 combined with the piston 42 is curved by the pressure difference and opens the gas flow path (F) in the piston 42. Herein, the coolant gas is sucked into the compression space (P) of the cylinder 41 through the gas flow path (F) of the piston 42.

Afterward, when the piston 42 is moved from the bottom dead point to the upper dead point, by the compression difference between the compression space (P) and the suction space and the elastic force of the suction valve 43, the curved suction valve 43 is straightened and closes the gas flow path (F) of the piston 42, simultaneously the coolant gas sucked into the compression space (P) of the cylinder 41 is compressed. And, when the piston 42 reaches the upper dead point almost, the discharge valve 44B is open, and the compressed coolant gas is discharged. The coolant gas is continually compressed by performing the above-described process repeatedly.

Herein, in the opening of the suction valve 43, by forming the head portion 302 of the combining bolt 300 fixed to the piston 42 so as to have the width overlapped with part of the opening/closing portion 43b of the suction valve 43, because the opening/closing portion 43b is caught on the head portion 302 of the combining bolt 300 in the opening, the opening is restricted, and accordingly it is possible to prevent the suction valve 43 from being excessively open and adjust a closing time appropriately although a strength of he suction valve 43 is lowered.

Hereinafter, other examples of the third embodiment of the suction valve assembly of the reciprocating compressor in accordance with the present invention will be described.

Figure 16:
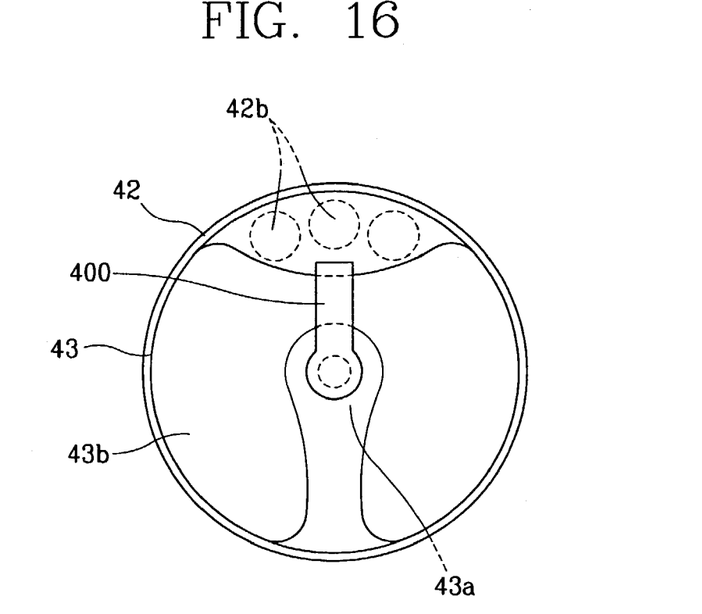
FIG. 16 is a front view illustrating another example of the suction valve assembly of the reciprocating compressor in accordance with the third embodiment of the present invention.
Figure 17:
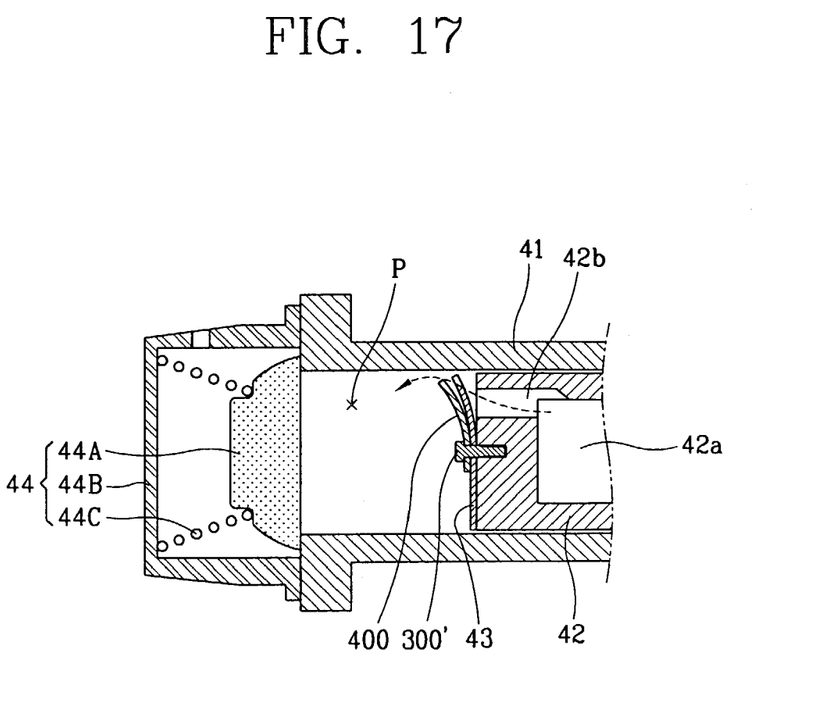
FIG. 17 is a longitudinal-sectional view illustrating another example of a compression part of the suction valve assembly of the reciprocating compressor in accordance with the third embodiment of the present invention.

In more detail, in the above-described embodiment, the opening of the opening/closing portion 43b of the suction valve 43 is adjusted by using the head portion 302 of the combining bolt 300, however, in the present embodiment, as depicted in FIGS. 16 and 17, a retainer 400 is installed between the suction valve 43 and a combining bolt 300'.

The more the retainer gets close to the discharge valve 44B, the retainer is covered toward the compression space (P) with a certain radius of curvature, and it has a length so as to be overlapped with the part of the opening/closing portion 43b of the suction valve 43.

Figure 18:
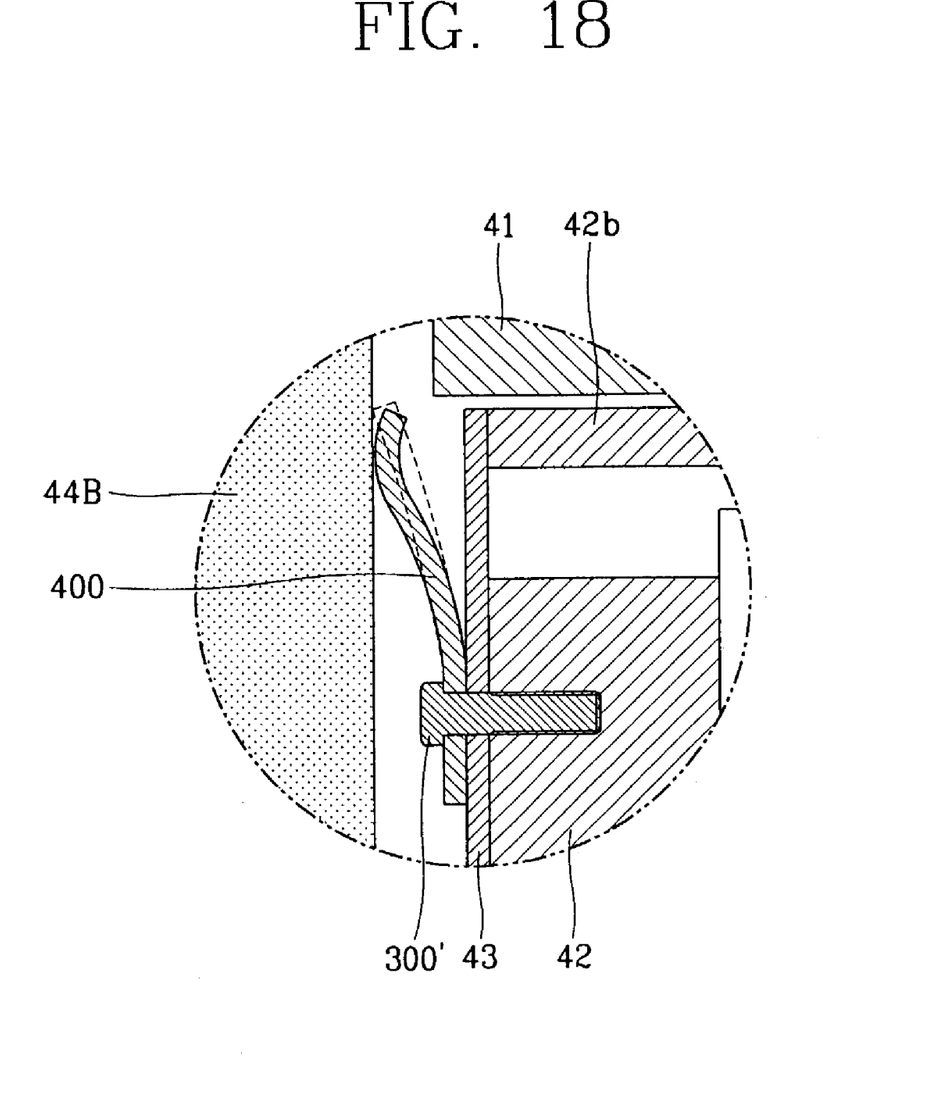
FIG. 18 is a partial-sectional view illustrating another example of a retainer of the suction valve assembly of the reciprocating compressor in accordance with the third embodiment of the present invention.

In addition, the retainer 400 has to have a strength capable of restricting the opening degree of the suction valve 43, however, as depicted in FIG. 18, it is preferable for the retainer 400 to have a strength capable of reducing volume in clash against the discharge valve 44B by being smoothly bent.

Because the retainer in accordance with the present embodiment performs almost the same function of the head portion of the combining bolt in accordance with the above-described embodiment, detailed description will be abridged.

In more detail, in each embodiment of the suction valve assembly of the reciprocating compressor in accordance with the present invention, by installing an elastic member for absorbing impact of the suction valve on the front end of the piston facing the suction valve, it is possible to buffer clash between the suction valve and the front end of the piston, it is possible to reduce valve clash noise occurred in opening/closing of the suction valve, and accordingly a reliability of the compressor can be improved.

In addition, by adding a valve seat made of the same material with the suction valve and having an even surface, in the opening/closing of the suction valve, it is possible to prevent the suction valve from being damaged by burr, etc. from occurring, and accordingly a reliability of the compressor can be improved.

In addition, by using a combining bolt for fixing the suction valve to the piston or using an additional retainer, an open degree of the suction valve is restricted, when a strength of the suction valve is reduced, an opening/closing speed of the valve can be improved by adjusting an open degree of the valve appropriately, and accordingly an efficiency of the compressor can be improved.

What is claimed is:

1. A suction valve assembly comprising:
   a cylinder;
   a piston installed within the cylinder, the piston having a gas path formed therein and a plurality of suction through holes formed at a front end of the piston and fluidically connected with the gas path;
   a suction valve configured to have a fixation portion formed at the center thereof and two arms extending from an edge of the fixation portion and an opening/closing portion integrally formed with the two arms to open and close the suction through holes; and
   an elastic member installed between the front end of the piston and the suction valve in order to absorb impacts of the suction valve during operation,
   wherein the elastic member is inserted into the plurality of suction through holes.

2. The assembly of claim 1, wherein plural buffer grooves in which a fluid can remain are formed at the front end of the piston.

3. The assembly of claim 1, further comprising:
   a valve seat installed between the suction valve and the front end of the piston to absorb clash impact in opening/closing of the suction valve.

4. The assembly of claim 3, wherein the valve seat is made of the same material of the suction valve.

5. The assembly of claim 1, wherein a plurality of subsidiary grooves are formed at the front end of the piston and the elastic member is inserted into the subsidiary grooves.

6. The assembly of claim 1, wherein the assembly is part of a reciprocating compressor.

7. A suction valve assembly comprising:
a cylinder;
a piston installed within the cylinder, the piston having a gas path formed therein and a plurality of suction through holes formed at a front end of the piston and fluidically connected with the gas path;
a suction valve configured to have a fixation portion formed at the center thereof and two arms extending from an edge of the fixation portion and an opening/closing portion integrally formed with the two arms to open and close the suction through holes;
an elastic member installed between the front end of the piston and the suction valve in order to absorb impacts of the suction valve during operation; and
a combining member comprising a body portion passing a through hole formed at the fixation portion of the suction valve and combined with a combining groove of the piston and a head portion formed at an end of the body portion, having a certain width so as to be overlapped with opening/closing the portion of the suction valve to restrict the opening of the suction valve,
wherein the head portion of the combining member has a certain width so as to overlap with part of the suction through holes.

8. The assembly of claim 7, wherein a stepped portion is formed at the end of the head portion of the combining member in order to make the center portion of the suction valve contact to the front end of the piston tightly.

9. The assembly of claim 7, wherein a washer is inserted-combined between the combining member and the suction valve in order to make the center portion of the suction valve contact to the front end of the piston tightly.

10. The assembly of claim 8, wherein the stepped portion is formed as one body with the combining member so as to contact with the surface of the compression space of the suction valve.

11. A reciprocating compressor comprising:
a piston installed within a cylinder and having a gas path formed therein and a plurality of suction through holes formed at a front end of the piston and communicating with the gas path;
a suction valve configured to have a fixation portion formed at the center thereof and two arms extending from an edge of the fixation portion and an opening/closing portion integrally formed with the two arms to open and close the plurality of suction through holes;
a discharge valve configured to open and close the cylinder and to adjust the discharge of compressed gas exhausted by the piston; and
an impact absorbing member located between the suction valve and the front end of the piston,
wherein the impact absorbing member is inserted into at least one of the suction through holes.

12. The compressor of claim 11, further comprising a plurality of buffer grooves formed around the plurality of suction through holes at the front end of the piston to provide additional impact absorption when the suction valve closes.

13. The compressor of claim 11, wherein a plurality of subsidiary grooves are formed at the front end of the piston and the impact absorbing member is inserted into the subsidiary grooves.

14. The compressor of claim 11, wherein the impact absorbing member is an elastic spring.

* * * * *